United States Patent [19]

Booles

[11] Patent Number: 5,556,679
[45] Date of Patent: Sep. 17, 1996

[54] FLEXIBLE DUAL WALL HOSE OR PIPE ASSEMBLY

[75] Inventor: Harold F. Booles, Little Rock, Ark.

[73] Assignee: A. O. Smith Corporation, Milwaukee, Wis.

[21] Appl. No.: 228,476

[22] Filed: Apr. 15, 1994

[51] Int. Cl.$^6$ .................................................. G01M 3/00
[52] U.S. Cl. ........................ 428/36.91; 428/182; 428/184; 138/104
[58] Field of Search ................................ 428/36.91, 182, 428/184; 138/104

[56] References Cited

U.S. PATENT DOCUMENTS

| | | | |
|---|---|---|---|
| 1,736,923 | 11/1929 | Lalonde | 138/112 |
| 2,328,168 | 8/1943 | Risley | 288/11 |
| 3,053,554 | 9/1962 | Magos et al. | 285/114 |
| 3,257,719 | 6/1966 | Larkfeldt | 29/451 |
| 3,330,303 | 7/1967 | Fochler | 138/120 |
| 3,332,446 | 7/1967 | Mann | 138/114 |
| 3,490,496 | 1/1970 | Stearns | 138/112 |
| 3,658,097 | 4/1972 | Martin et al. | 138/121 |
| 3,897,090 | 7/1975 | Maroschak | 285/260 |
| 3,903,928 | 9/1975 | Sykes et al. | 138/109 |
| 3,958,425 | 5/1976 | Maroschak | 61/11 |
| 3,974,862 | 8/1976 | Fuhrmann | 138/37 |
| 4,643,229 | 2/1987 | Hickin | 138/109 |
| 4,718,568 | 1/1988 | Dal Palù | 220/86 |
| 4,932,257 | 6/1990 | Webb | 73/40.5 |
| 4,966,202 | 10/1990 | Bryan et al. | 138/172 |
| 4,984,605 | 1/1991 | Schippl | 138/149 |

FOREIGN PATENT DOCUMENTS 982960  2/1976  Canada ........................................ 189/3

Primary Examiner—Charles R. Nold
Attorney, Agent, or Firm—James Earl Lowe, Jr.; Robert E. Clemency

[57] ABSTRACT

A dual pipe installation comprising a sump including a wall having inner and outer surfaces, and an opening extending there between, a pipe assembly extending into the sump and comprising an outer flexible pipe extending lengthwise and being defined by an endless wall which includes a plurality of corrugations in serially adjacent lengthwise relation, and a lengthwise inwardly open channel, and an inner flexible pipe which extends within the outer pipe, which is defined by an endless wall defining an interior and including a plurality of corrugations in serially adjacent lengthwise relation, and a projecting end portion extending axially outwardly beyond the end of the outer pipe and having an outer end, and which defines, with the outer pipe, an annular space.

10 Claims, 3 Drawing Sheets

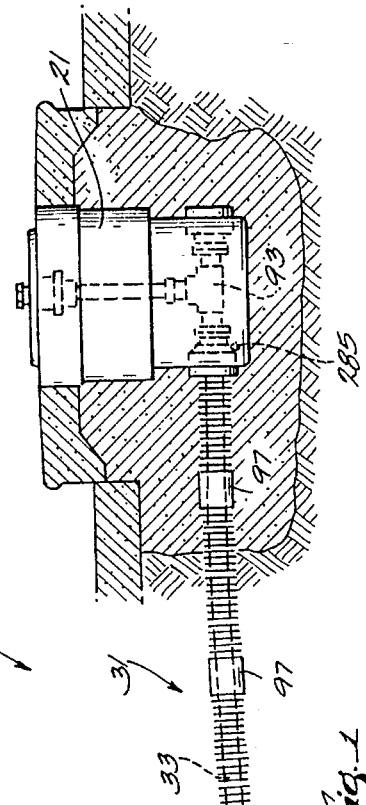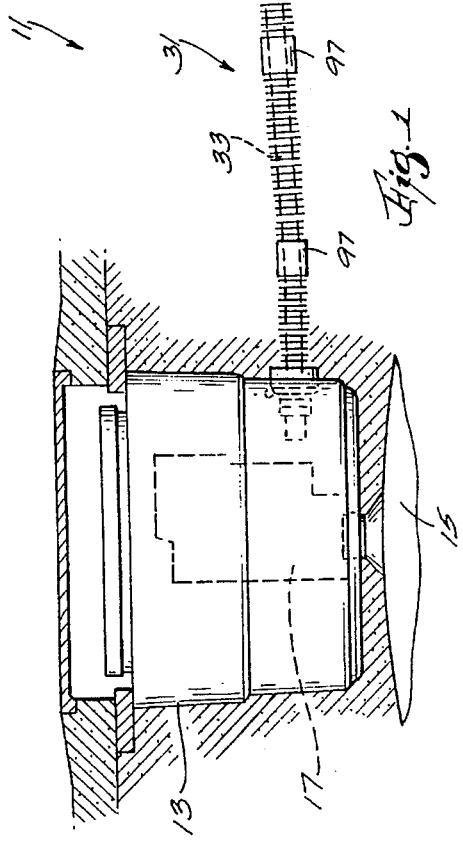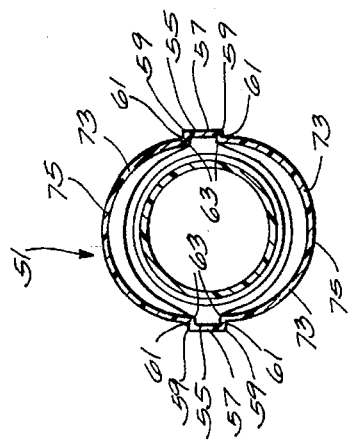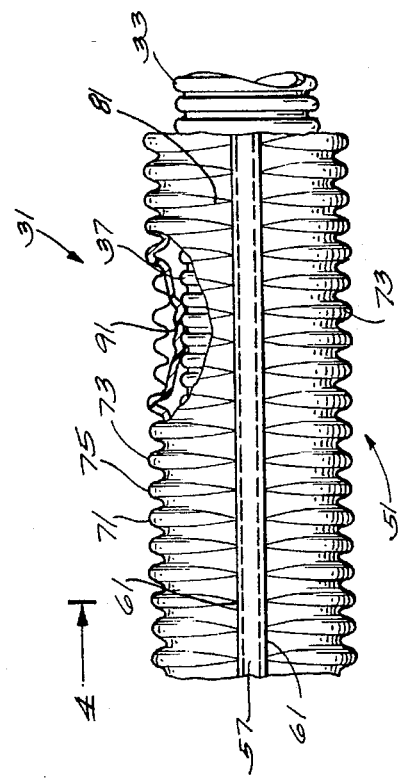

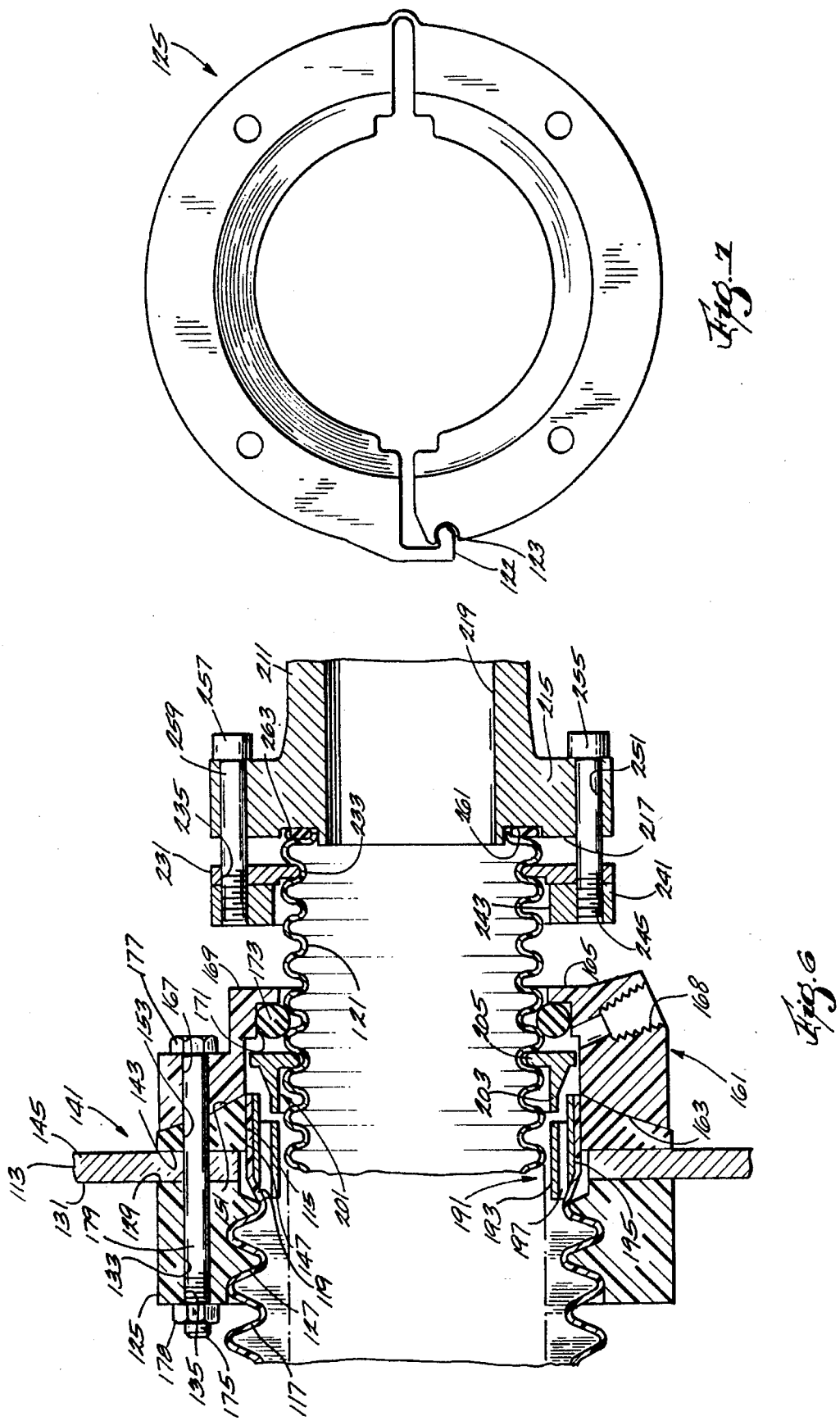

FLEXIBLE DUAL WALL HOSE OR PIPE ASSEMBLY

BACKGROUND OF THE INVENTION

The invention relates generally to underground liquid distribution systems. More particularly, the invention relates to composite pipe assemblies for such installations, i.e., to dual wall hoses or pipe assemblies including an inner or primary pipe or hose and an outer or containment pipe or hose housing the primary pipe.

SUMMARY OF THE INVENTION

The invention provides a composite pipe assembly comprising an inner flexible pipe extending lengthwise and being defined by an endless wall which includes a plurality of corrugations in serially adjacent lengthwise relation, and an outer flexible pipe which is spaced outwardly from said inner pipe and forms an enclosure for the inner pipe, and which is defined by an endless wall including a lengthwise inwardly open channel restricting flexibility in one direction, and a series of axially adjacent corrugations extending transversely to and from said lengthwise channel.

The invention also provides a dual pipe installation comprising a sump including a wall having an inner surface, an outer surface, and an opening extending between the inner and outer surfaces, a pipe assembly comprising an inner pipe, an outer pipe surrounding the inner pipe, and defining, with the inner pipe, an annular space, and means for sealingly connecting the outer pipe to the wall and comprising clamping means including a wedge member including an inner surface engaging the outer pipe, a second surface engaging the inner surface of the wall, and a third surface extending at an acute angle to the inner surface and the second surface.

The invention also provides a dual pipe installation comprising a sump including therein a fitting having therein a bore, a pipe assembly extending into the sump and comprising an outer flexible pipe having an end, and an inner flexible metal pipe having an interior, extending within the outer pipe, including a projecting end portion extending axially outwardly beyond the end of the outer pipe and having an outer end, and means for sealingly connecting the outer end of the inner pipe with the fitting and with the interior of the inner pipe in communication with the bore in the fitting. In one embodiment, the connecting means includes a retainer member fixed on the projecting portion of the inner pipe, an anchor member located adjacent the retainer member on the opposite side thereof from the fitting, and means including a threaded fastener passing through the retaining member and through one of the anchor member and the fitting, threaded into the other of the anchor member and the fitting, and including a head engaging the one of the anchor member and the fitting. In one embodiment, the inner pipe is fixed relative to the sump wall, and the outer flexible pipe extends lengthwise and is defined by an endless wall which includes a plurality of corrugations in serially adjacent lengthwise relation and a lengthwise inwardly open channel.

Other features of and advantages of the invention will become apparent to those skilled in the art upon review of the following detailed description, claims, and drawings.

THE DRAWINGS

FIG. 1 is a side elevational view, partially in section, of an underground distribution system embodying various of the features of the invention.

FIG. 3 is a side plan view of the dual wall hose or composite pipe assembly which is shown in FIG. 2 and which is rotated ninety-degrees (90°) from the orientation of FIG. 2.

FIG. 4 is a end view taken along line 4—4 of FIG. 3.

FIG. 6 is an enlarged fragmentary view, partially in a section, of a portion of the underground distribution system shown in FIG. 1.

FIG. 7 is a side view of an outer ring of the underground distribution system.

Figure 2:
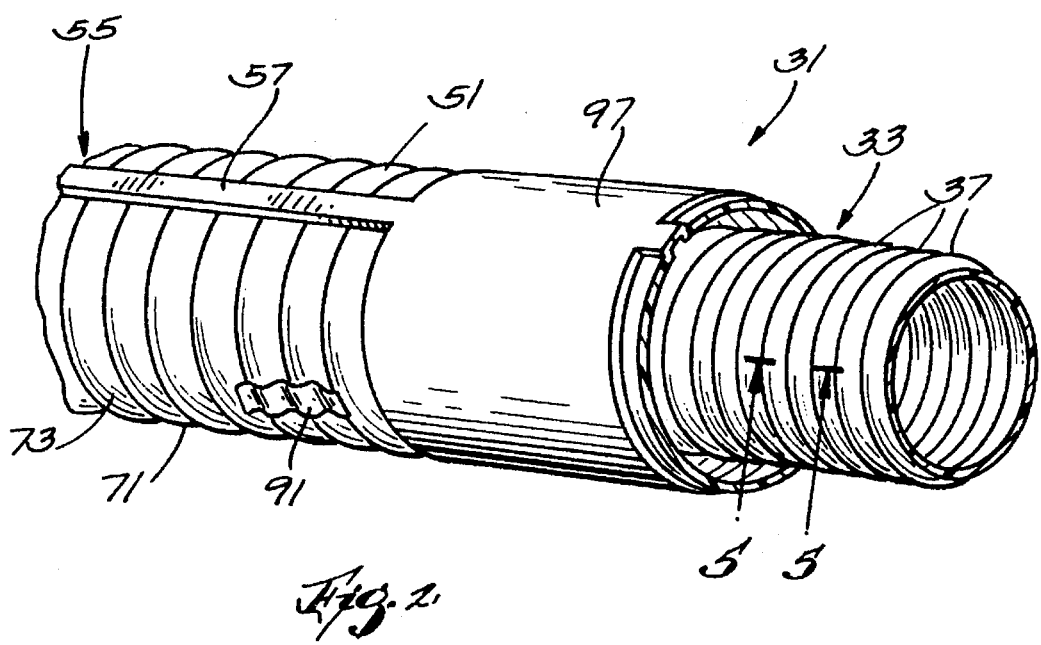
FIG. 2 is an enlarged fragmentary perspective view of a dual wall hose or composite pipe assembly included in the underground fluid distribution system shown in FIG. 1.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Shown in FIG. 1 of the drawings is an underground fluid distribution system 11 including an underground tank 15 which is adapted for storage of fluid, such as gasoline, and a first underground sump 13 housing a pump 17 for pressurizing the fluid to be distributed.

The underground fluid distribution system 11 also includes one or more second sumps 21 located remotely from the first sump 13 containing the pump 17 and can be of the type adapted to have mounted there above a gasoline dispensing device (not shown).

Figure 5:
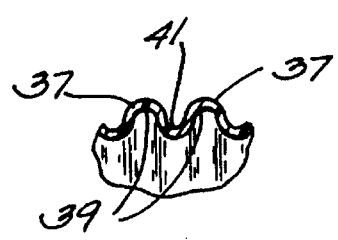
FIG. 5 is a fragmentary sectional view taken along line 5—5 of FIG. 2.

The underground fluid distribution system 11 also includes a dual wall hose or composite pipe assembly 31 which is fabricated of a flexible material which is impermeable to the fluid to be distributed. The dual wall hose or composite pipe assembly 31 is buried below ground level and extends between the sumps 13 and 21 to enable distribution of fuel from the pump 17 to the remote sump(s) 21 and thereby to the gasoline dispensing device(s). The dual wall hose or composite pipe assembly hose 31 is shown in greater detail in FIGS. 2 through 5, and includes a flexible inner or primary hose or pipe 33 which extends in a lengthwise direction, which includes an interior for conveying the fluid being distributed, and which is defined by an endless wall including a plurality of adjacent corrugations 37 which are serially connected to one another. Each corrugation 37 includes an inwardly open rounded section 39 and an outwardly open rounded section 41 in axially adjacent connected relation to the adjacent inwardly open sections 39.

The dual wall hose or composite pipe assembly 31 also includes a flexible outer or containment pipe or hose 51 which, in general, surrounds the primary hose or inner pipe 33 in radially spaced outward relation thereto, thereby forming a containment or enclosure for the inner pipe, which defines, with the inner pipe 33, an annular space 53, and which is defined by an endless wall including, in the specifically disclosed construction, a pair of diametrically oppositely located, inwardly open channels 55, one of which is located, when the composite pipe assembly 31 is installed underground, along the bottom of the composite pipe assembly 31 in position to collect any leakage which may occur and to facilitate flow thereof to the low end of the composite pipe assembly 31 and to the adjacent one of the sumps 13 and 21. More particularly, each of the channels 55 includes a bottom wall 57 having parallel side edges 59 extending lengthwise of the composite pipe assembly 31, and opposed side walls 61 extending from the side edges 59 and having inner edges 63 connected to the semi-corrugations still to be described. In other embodiments, other channel shapes may be used.

While the disclosed construction involves upper and lower channels 55, at least some of the advantages of the invention can be obtained with a single channel which is located at the bottom of the composite pipe assembly 31 after installation.

The channel(s) 55 advantageously serve, as already indicated, to provide a flow path for any leakage which may occur while, at the same time, serve to rigidify the composite pipe assembly against flexure in the vertical direction, and, at the same time, to afford horizontal flexibility of the composite pipe assembly 31 to permit non-linear positioning of the composite pipe assembly 31 between sumps.

The endless wall of the containment hose or outer pipe 51 also includes a series of axially adjacent semi-corrugations 71. Each corrugation 71 includes four generally identical semi-corrugation quadrants 73 respectively extending transversely from inner edges 63 of the channels 55. The corrugations 71 serve to provide flexibility in the horizontal direction to the containment hose 51 and provide a mechanical lock with the earth when the assembly is buried.

More particularly, each semi-corrugation quadrant 73 includes a fully corrugated portion 75 located about ninety-degrees (90°) from one of the channels 55 (and joining another fully corrugated portion spaced ninety-degrees (90°) from the other of the channels).

Still more particularly, each quarter semi-corrugation quadrant 73 is defined by a recessed portion 79 forming an outwardly open rounded section which extends circumferentially and which includes a shallow pointed end 81 intersecting with the associated one of the channels 55, which increases in width and depth with increasing distance from the associated one of the channels 55, and which, as indicated, has maximum width and depth abut ninety-degrees (90°) from the channel and extends integrally from the outer end of a similar semi-corrugated quadrant extending from the same side of the opposite one of the channels 55. In other embodiments, the pointed end 81 may be spaced from the channel 55. In alternate embodiments, a spiral corrugation pattern could be used.

In the preferred embodiment, the inner pipe 33 is made of stainless steel, and the outer pipe 51, is made of a thermoplastic, preferably linear low density, polyethylene with eight percent polybutylene.

Means are also provided for fixing together the inner and outer pipes 33 and 51 at locations spaced lengthwise of the composite pipe assembly 31. While other specific constructions can be employed, in the disclosed construction, the outer pipe 55 includes portions 91 which are spaced lengthwise there along and which are depressed and engaged in the outwardly open semi-cylindrical section 41 of one or more of the corrugations 37 of the inner pipe 33. The engaged portions 91 are preferably located generally at abut ninety-degrees (90°) from the channels 55 so as to avoid interference with leakage flow in the channels 55.

Connection together of the primary and containment hoses 33 and 51 at intervals along their length serves to transfer axial loads on the primary hose or inner pipe 33 through the containment hose or outer pipe 51 and into the earth.

The containment hose or outer pipe 51 can also include portions 97 which are spaced lengthwise along the length thereof (abut every foot) and which are generally of cylindrical configuration, and which can include one or more channels 55 (not shown) or can omit such channels when the diameter thereof is approximately equal to the diametric distance between the bottom walls 57 of the channels 55, thereby to avoid interfering with the leakage flow in the channels 55 to one of the sumps. The portions 97 provide areas where the pipe assembly 31 can be cut to trim the length thereof to facilitate connection of the pipe assembly 31 to the sumps 13 and 21.

Means are also provided for sealingly connecting the containment hose or outer pipe 51 to the slumps 13 and 21 in such manner as to permit communication of the channels 55 with the interior of the sumps 13 and 21. The sealing means also permits passage of the primary hoses or inner pipes 33 into the sumps 13 and 21, for fixedly connecting the inner pipe 33 to whatever fitting may be located in the slumps 13 and 21, as for instance, the tee-fitting 93 shown in FIG. 1. The sealing means also permits leak testing the annular space 53 between the inner and outer pipes 33 and 51.

While other constructions can be employed, in the disclosed construction, the means for sealingly connecting the outer pipe 51 to the sump wall 113 includes formation of the outer pipe 51 with an end portion 115 which is cylindrical (part of one of the portions 97) and which has a diameter greater than the smallest diameter of an adjacent corrugated portion 117 and sufficient to permit flow from the channel(s) 55. In this regard, the end portion 115 is connected to the adjacent corrugated portion 117 by an inclined portion 119 which extends radially inwardly from the cylindrical end portion 115 to the adjacent corrugated portion 117.

The inner pipe 33 includes a corrugated end portion 121 which projects axially or inwardly of the sump(s) 13 and 21 beyond the end of the cylindrical end portion 115 of the outer pipe 51.

The means for sealingly connecting the outer pipe 51 to the sump wall 113 also includes clamping means operable between the outer pipe 51 and the sump wall 113.

While other constructions can be employed, in the disclosed construction, such clamping means comprises an outer ring or member 125 which includes an inner corrugated surface 127 engaging the corrugations of the adjacent corrugated portion 117 of the outer pipe 51. The outer ring 125 also includes a surface 129 which engages the outer surface 131 of the sump wall 113, and at least one bore 133 which extends perpendicularly to the surface 129.

Preferably the outer ring 125 is fabricated from plastic material in two 180° segments, each of which segments includes a plurality of the bores 133. The two segments are hinged to each other at one end thereof, as shown in FIG. 7. The other end of the top and bottom segments, respectively, include a latch 122 and a receptacle 123 to aid assembly of the outer ring 125 to the outer pipe 51.

The clamping means also comprises a sealing gasket member or wedge member 141 which includes a first surface 143 engaging the inner surface 145 of the sump wall 113, a cylindrical surface 147 engaging the cylindrical end portion 115 of the outer pipe 51, and an inclined surface 151 extending at an acute angle to the wall engaging surface 143. In addition, the gasket member 141 includes, for each of the bores 133 in the outer ring 125, a radially elongated bore 153 which extends between the surfaces 143 and 151 and which respectively register with the associated bore 133 in the outer ring 125.

The gasket member 141 is preferably fabricated of rubber-like material. If desired, a plurality of relatively small projections (not shown) can be provided on the cylindrical surface 147 and on the wall engaging surface 141 to seal the engaged surfaces 145 and 115.

The clamping means also includes a clamping ring or member 161 which includes an inclined surface 163 engaged with the inclined surface 151 of the gasket member 141, and a radially extending outer surface 165 spaced from the incline surface 151 and extending generally perpendicularly to the cylindrical end portion 115 of the outer pipe 51. The clamping member or ring 161 also includes, for each of the bores 153 in the gasket member 141, a bore 167 located in registry therewith.

Preferably, the clamping member or ring 161 is made in one piece from plastic material. The clamping ring 161 also includes means for permitting fluid to drain from the annular space between the inner pipe 33 and the outer pipe 51. The drain means comprises a threaded drain bore 168 located at the bottom of the clamping ring 161.

In order to fix and seal the inner pipe 33 relative to the clamping ring or member 161, the clamp member or ring 161 also includes an axially offset radially inwardly projecting portion or foot 169 including an inner cylindrical surface 171 which is radially spaced from the corrugations of the projecting end portion 121 of the inner pipe 33. Located between the inner surface 171 and the inner pipe 33 is an O-ring seal 173. It is noted that the gasket member 141 and the clamping member 161 can be slid over the projecting end portion 121 of the inner pipe 33 to engage the gasket member 141 with the inner sump wall 145 and the cylindrical end portion 115 of the outer pipe 51.

The clamping means also includes, for each of the bores 167, a threaded fastener 175 made of plastic including a head 177 which engages the outer surface 165, and a shank 179 which passes through the associated bore 167 in the clamping member 161, through the associated radially elongated bore 153 in the gasket member 141, through an associated opening 181 in the sump wall 113, and through the associated bore 133 in the outer ring 125 for threaded engagement with a plastic nut 178. While there is some radial clearance between the shank 179 of the threaded fastener 175 and the gasket member 141, in general, the shank 179 has a snug fit in the clamping member or ring 161 and in the threaded portion 135 of the bore 133 in the outer ring or member 125.

During assembly of the clamping means, increasing the threaded engagement of the threaded fasteners 175 with the nuts 178 causes the gasket member 141 to snugly and sealingly engage the inner sump wall 145 and the cylindrical portion 115 of the outer pipe In order to assure a fluid flow path into and from the annular space 53 between the inner and outer pipes 33 and 51, and, in particular, to permit drainage from the channels 55, the means for connecting the pipe assembly 31 to the sump wall 113 also includes means for maintaining the cylindrical end portion 115 of the outer pipe 51 in radially spaced relation from the inner pipe 33, and to keep the end portion 115 of the outer pipe 51 in sealing engagement with the wedge member 143. While various other constructions can be employed, in the disclosed construction, such spacer means comprises a sleeve member 191 including an inner cylindrical wall 193 engaging the outer corrugated surface of the inner pipe 33, an outer cylindrical wall 195 engaging the inner surface of the cylindrical end portion 115 of the outer pipe 51, and angularly spaced means, as for instance, angularly spaced holes 197 extending radially between the inner and outer walls 193 and 195, for affording free fluid flow axially thereof relative to the annular space 53.

The means for maintaining the cylindrical end portion 115 of the outer pipe 51 in radially spaced relation from the inner pipe 33 also includes means for preventing axial movement of the sleeve member 191 relative to the pipe assembly 31, and for fixedly connecting the inner pipe 33 to the sump wall 113. While other constructions can be employed, in the disclosed construction, such means comprises a stop member 201 fixed relative to the inner pipe 33 and in position to prevent axial movement of the sleeve member 191 to the right in FIG. 6.

The stop ring or member 201 includes an outer ring portion 203 extending axially adjacent to and between the outer surface of the corrugations of the projecting end portion 121 of the inner pipe 33 and the cylindrical surface 171 of the foot 169 of the clamp member or ring 161. The stop ring or member 201 includes radially inner ring portion 205 extending inwardly from the right end of the outer ring portion 203 (as shown in FIG. 6) and into one of the annular spaces between adjacent corrugations to prevent relative axial movement between the stop ring 201 and the inner pipe 33.

The stop member 201 is located generally beneath and to the left, as seen in FIG. 6, of the radially inwardly projecting foot 169 of the clamping member 161 and, as already mentioned, in position to engage the adjacent end of the sleeve member 191 so as to prevent material movement thereof to the right in FIG. 6. The stop ring 201 is preferably fabricated of flexible plastic in a split ring, jaw-like construction. Alternately, the stop member can be fabricated in two 180° segments which are connected to each other in any suitable manner.

Material movement of the sleeve member 191 to the left in FIG. 6 is prevented by engagement of the other end of the sleeve member 191 with the inclined portion 119 of the outer pipe 51.

While other arrangements can be employed, the means for fixedly connecting the outer end of the inner pipe 33 to the fitting, as for instance, the tee fitting 93 shown in FIG. 6 includes a nipple 211 having a flange 215 with an abutment or outer surface 217, and which also includes a bore 219 extending through the nipple 211 and affording fluid flow from the bore 219 into the fitting 93. The nipple 211 is fabricated from noncorrosive material, preferably plated steel.

The means for fixedly connecting the outer end of the inner pipe 33 to the fitting 93 also includes a retaining ring or member 231 which has a central opening 233 with a diameter less than the major or larger diameter of the corrugations of the end portion 121 of the inner pipe 33, and which, accordingly, extends into one of the annular spaces between adjacent corrugations.

Preferably, the retaining member 231 is fabricated from noncorrosive material, preferably plated steel, in two 180° segments with each segment including a plurality of bores 235 extending in the direction of the axis of the pipe assembly 31.

The means for fixedly connecting the end of the inner pipe 33 to the nipple 211 also includes an anchor member or ring 241 having a central bore 243 with an inner diameter greater than the larger or maximum diameter of the corrugated end portion 121 of the inner pipe 33, and a series of threaded holes 245 equal in number to and in registry with the bores 235 in the retainer ring or member 231. The anchor member 241 is preferably fabricated from non-corrosive material, preferably plated steel, can be a one piece member, and is assembled about the corrugated end portion 121 prior to assembly of the projecting end portion 121 to the nipple 211.

The connecting means also includes, in the flange 215 of the nipple 211, a series of bores 251 corresponding to and in registry with the bores or holes 245 in the retainer member 241, which bores 251 extend from the outer or abutment surface 217 to a spaced flange surface 253, together with a series of threaded fasteners 255 which extend in the bores 251, which include heads 257 engaging the flange surface 253, and shanks 259 which extend through the bores 235 in the retaining member 231 are threaded into the threaded holes 245 in the anchor member 241. The connecting means also includes means for sealing the end of the inner pipe 33 to the nipple 211. In this embodiment, such sealing means comprises a circular grove 261 in the flange outer surface 217 in radially spaced relationship to the bore 219, and a heat resistant seal 263 in the grove 261 and engaging the last corrugation of the end of the inner pipe 33.

While other constructions can be employed, the means for leak testing the annular space 53 between the inner and outer pipes 33 and 51 comprises a valved conduit structure 285 (see FIG. 1) which can be threadably inserted into the threaded drain bore 168, and which affords passage into the annular space of a pressurized gas. After testing, the conduit structure 285 is removed.

Various of the features of the invention are set forth in the following claims.

I claim:

1. A composite pipe assembly comprising an inner flexible pipe extending lengthwise and being defined by a wall which includes a plurality of corrugations in serially adjacent lengthwise relation, and an outer flexible pipe which is spaced outwardly from said inner pipe and forms an enclosure for said inner pipe, and which is defined by a wall including a lengthwise inwardly open channel restricting flexibility in one direction, and a series of axially adjacent corrugations extending transversely to and from said lengthwise channel.

2. A composite pipe assembly in accordance with claim 1 wherein said channel includes two exposed side walls which extend generally vertically when said pipe assembly is installed in the ground, and wherein said one direction is generally vertically.

3. A composite pipe assembly in accordance with claim 1 wherein said outer pipe includes depressed connecting portions spaced lengthwise with respect to each other and formed to engage one or more of said corrugations of said inner pipe.

4. A composite pipe assembly in accordance with claim 3 wherein said connecting portions are located at ninety-degrees (90°) from said channel.

5. A composite pipe assembly in accordance with claim 3 wherein each of said corrugations of said inner pipe includes an inwardly open rounded section and an outwardly open semi-cylindrical section in axially adjacent and connected relation to said inwardly open section, and wherein said connecting portion extends into at least one of said outwardly open semi-cylindrical sections.

6. A composite pipe assembly in accordance with claim 1 wherein said outer pipe includes a second inwardly open channel in diametrically opposite relation to said first mentioned channel.

7. A composite pipe assembly in accordance with claim 1 wherein said channel include a bottom wall having parallel side edges and side walls extending from said side edges and having inner edges connected to said semi-corrugations.

8. A composite pipe assembly in accordance with claim 1 wherein said semi-corrugations include a fully corrugated portion located ninety-degrees (90°) from said channel.

9. A composite pipe assembly in accordance with claim 8 wherein said semi-corrugations are defined by recessed portions which extend circumferentially and which include a shallow pointed end adjacent said channel and which have maximum width and depth about ninety-degrees (90°) from said channel.

10. A composite pipe assembly comprising an inner pipe extending lengthwise and being defined by a wall which includes a plurality of corrugations located in lengthwise serially adjacent connected relation and each including an inwardly open rounded section and an outwardly open rounded section in axially adjacent and connected relation to said inwardly open rounded section, and an outer pipe which forms an enclosure for said inner pipe, which is spaced outwardly from said inner pipe, and which is defined by a wall including a pair of diametrically oppositely located, inwardly open channels which extend lengthwise and which each include a bottom wall having parallel side edges, and side walls extending in generally parallel relation to each other from said side edges and having inner edges, a series of axially adjacent semi-corrugations each including four quadrants respectively extending transversely to and from said inner edges of said channels and each including a fully corrugated portion located about ninety-degrees (90°) from the associated one of said channels, said fully corrugated portions being partially defined by a recess which extends circumferentially and which includes a shallow pointed end intersecting with the associated one of said channels and which has maximum width and depth about ninety-degrees (90°) from said channels, and depressed connecting areas spaced lengthwise with respect to each other, located at ninety-degrees (90°) from said channels, and formed to engage one or more of said outwardly open rounded sections of said corrugations of said inner pipe.

* * * * *